United States Patent
Benmimoun et al.

(10) Patent No.: US 10,906,584 B2
(45) Date of Patent: Feb. 2, 2021

(54) METHOD AND DEVICE THAT ASSISTS A PARKING MANEUVER OF A MOTOR VEHICLE

(71) Applicant: FORD GLOBAL TECHNOLOGIES, LLC, Dearborn, MI (US)

(72) Inventors: Ahmed Benmimoun, Aachen (DE); Nadja Wysietzki, Cologne (DE); Lars Kuhnert, Cologne (DE); Georg Neugebauer, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 16/032,197

(22) Filed: Jul. 11, 2018

(65) Prior Publication Data
US 2019/0016385 A1   Jan. 17, 2019

(30) Foreign Application Priority Data

Jul. 11, 2017  (DE) .................. 10 2017 211 799

(51) Int. Cl.
| B62D 15/02 | (2006.01) |
| G05D 1/02 | (2020.01) |
| G08G 1/16 | (2006.01) |

(52) U.S. Cl.
CPC ....... B62D 15/0285 (2013.01); G05D 1/0214 (2013.01); *G08G 1/168* (2013.01)

(58) Field of Classification Search
CPC ... B62D 15/0285; G05D 1/0214; G08G 1/168
USPC .......................................................... 701/23
See application file for complete search history.

(56) References Cited

U.S. PATENT DOCUMENTS

2007/0246284 A1   1/2007   Offer

FOREIGN PATENT DOCUMENTS

| CN | 201961241 U | 9/2011 |
| DE | 102007002262 A1 | 8/2008 |
| DE | 102011118726 A1 | 5/2013 |
| DE | 102013220931 A1 | 4/2015 |
| DE | 102014209907 A1 | 11/2015 |
| DE | 102015201038 A1 | 7/2016 |
| DE | 102015118468 | * 5/2017 |
| DE | 102015118468 A1 | 5/2017 |
| EP | 2098844 A1 | 9/2009 |
| EP | 2594461 A1 | 5/2013 |
| EP | 2689990 A2 | 1/2014 |

* cited by examiner

*Primary Examiner* — Gertrude Arthur Jeanglaude
(74) *Attorney, Agent, or Firm* — Frank Lollo; Brooks Kushman PC

(57) ABSTRACT

The present disclosure concerns a method and device that assists a parking maneuver of a motor vehicle. The method and device to assist a parking maneuver of a motor vehicle, with which the motor vehicle is maneuvered into an intended parking space at least partly, automatically, detects a curb bounded by at least one curb edge located in a vicinity of the motor vehicle. A trajectory is determined along which the motor vehicle can be moved into the intended parking space while carrying out at least one move of the maneuver. The trajectory is modified depending on at least one distance between the at least one curb edge and a tire of the motor vehicle that is expected for the trajectory while carrying out the parking maneuver.

13 Claims, 7 Drawing Sheets

METHOD AND DEVICE THAT ASSISTS A PARKING MANEUVER OF A MOTOR VEHICLE

CROSS-REFERENCE TO RELATED APPLICATIONS

This application claims foreign priority benefits under 35 U.S.C. § 119(a)-(d) to DE Application 10 2017 211 799.0 filed Jul. 11, 2017, which is hereby incorporated by reference in its entirety.

TECHNICAL FIELD

The present disclosure concerns a method and a device that assists a parking maneuver of a motor vehicle.

BACKGROUND

When parking a motor vehicle using a parking assistance system, scenarios can occur in which the motor vehicle has to drive onto an edge of a curb. In this case, it can, in turn, happen that in a first move of a maneuver during a parking maneuver, a tire first drives onto the curb and, in a next move of the maneuver, rolls or slips back again because the tire has been positioned on the edge of the curb at an end of the first move of the parking maneuver. This can in turn result in termination of the automatic parking maneuver and/or damage to the tire or a rim—for example as a result of a sudden increase in necessary steering torque.

From DE 10 2013 220 931 A1, inter alia, a method and a device for assisting a motor vehicle to drive onto a curb are known, wherein at least one operating parameter of the motor vehicle is modified in such a way that while at least one tire is driving onto the curb, an accompanying shock to the motor vehicle is reduced.

From EP 2 098 844 A1, inter alia, a method and a device for detecting a contact of a curb by a vehicle are known, wherein a current driving resistance of the vehicle is determined and contact with a curb may be concluded in an event of a change in the driving resistance.

From EP 2 689 990 A2, inter alia, a method and a device for detecting driving over a curb are known, wherein identification of driving over a curb is carried out if, during continuous analysis of a wheel speed of each wheel, one wheel has a positive acceleration and at least one of the other wheels has a negative acceleration for a respectively specified time interval.

From EP 2 594 461 A1, inter alia, a method for detecting a parking space and a parking aid system are known, wherein a geometric parameter of the parking space is determined using sensor data of a sensor device of the parking aid system, wherein further motor vehicle surroundings information that are different from the sensor data are also detected.

SUMMARY

It is an object of the present disclosure to provide a method and a device that assists a parking maneuver, which enables a reduction or avoidance of tire damage and/or rim damage during parking in a vicinity of an edge of a curb.

A method according to the disclosure that assists a parking maneuver of a motor vehicle, with which the motor vehicle is maneuvered into an intended parking space at least partly automatically, comprises the following steps:

detecting a curb disposed in a vicinity of a motor vehicle and bounded by at least one edge of a curb;

determining a trajectory along which the motor vehicle can be moved into a parking space while carrying out at least one move of the maneuver; and modifying said trajectory depending on at least one distance, which is to be expected between the edge of the curb and a tire of the motor vehicle, for said trajectory while carrying out the parking maneuver.

The disclosure is especially based on a concept of taking a position of a curb into account during planning of a parking trajectory. For this purpose, the curb is first detected using ultrasonic sensors, radar sensors, laser scanner sensors and/or camera sensors. Furthermore, according to the disclosure additional boundary conditions are taken into account during planning of the parking trajectory, or a determination of an end position of a respective move of the parking maneuver.

The planning of the parking trajectory is usually carried out with an aim of minimizing a number of maneuvering moves required of the parking maneuver, while at a same time excluding a collision with objects in the vicinity. According to the disclosure however, a curb position and a distance of an individual tire from the curb are also taken into account:

If it is determined that a tire on the curb was close to the edge of the curb in any of the determined end positions of moves of the maneuver, according to the disclosure, the end position of said move of the maneuver is adjusted in a suitable manner: said adjustment can include a displacement of the end position "rearwards" in a sense of increasing a distance of the tire from the edge of curb if a distance from a next object (for example a parked external vehicle) is sufficiently great, or above a threshold value. Alternatively, displacement of the end position can also include bringing the end position forwards, provided that driving the tire onto the curb is prevented if the distance from the next object (for example other parked external vehicles) is too small, or below a threshold value.

In this case, according to the disclosure in particular an increase in a number of necessary moves during the parking maneuver compared to a conventional trajectory planning can be accepted, for which, however, in return, a risk of damage to the tires and/or rims, or a risk of termination of the parking maneuver is reduced.

According to one embodiment, the step of modifying the trajectory includes the following steps:

determining, for the at least one move of the maneuver, the distance of the tire from the edge of the curb that is to be expected at the end of said move of the maneuver; and adjusting the trajectory depending on said distance that is to be expected.

According to one embodiment, the adjustment of the trajectory is carried out in such a way that the distance of the tire from the edge of curb at the end of a relevant move of the maneuver is increased compared to a value to be expected without the adjustment.

According to one embodiment, the adjustment of the trajectory is carried out in such a way that driving the tire onto the curb during the relevant move of the maneuver is avoided.

According to one embodiment, detection of the curb located in the vicinity of the motor vehicle is carried out using at least one ultrasonic sensor, radar sensor, laser scanner sensor and/or camera sensor.

The disclosure further concerns a device that assists a parking maneuver, such as, for example a control unit or microprocessor, wherein the device is configured to carry out a method with the features described above. For advantages and preferred embodiments, reference is made to the above descriptions in connection with the method according to the disclosure.

Further embodiments of the disclosure are to be found in the description and the subordinate claims.

The disclosure is described in detail below using exemplary embodiments with reference to the accompanying Figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the following, a typical process of the method according to the disclosure, and operation of the device according to the disclosure are described with reference to schematic FIGS. 1 through 5, and the flow chart represented in FIGS. 6A-6B.

Figure 1:
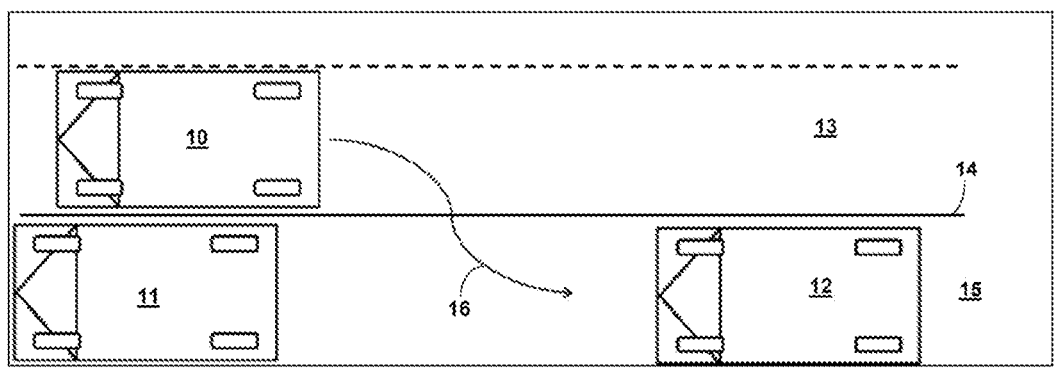
FIGS. 1 through 5 show schematic representations that illustrate possible processes of a method and device according to the disclosure.

FIG. 1 shows, first in a schematic representation, a typical starting position at a start of a parking maneuver, in which a motor vehicle 10 on a road 13 is to be parked in an available parking space 17 between other vehicles 11 and 12 that are disposed on a sidewalk 15, and the motor vehicle 10 must drive onto a curb bounded by an edge of the curb that is denoted by "14" for this purpose. A first determined possible parking trajectory is denoted by "16" in FIG. 1.

Figure 2:
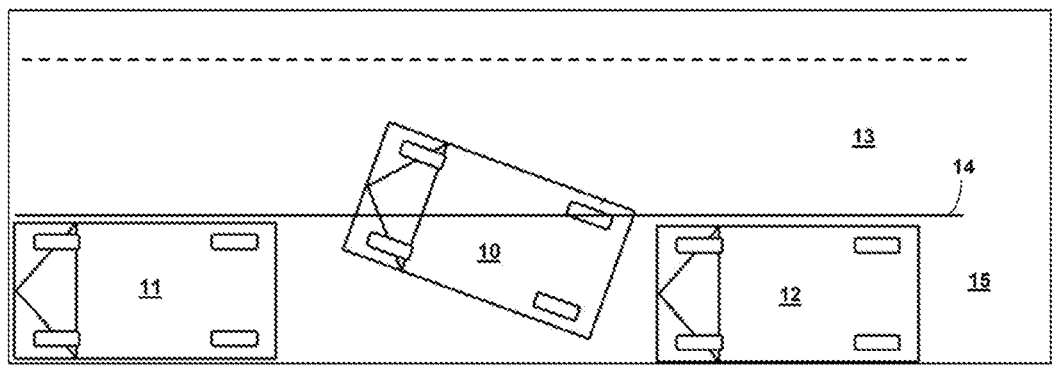
Figure 3:
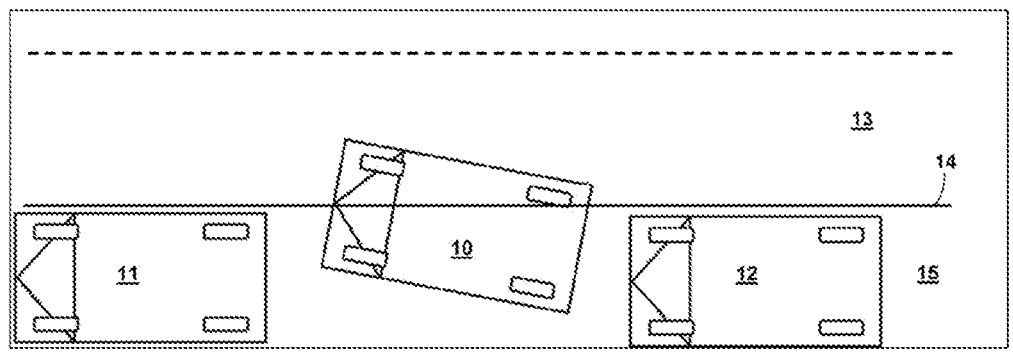
Figure 4:
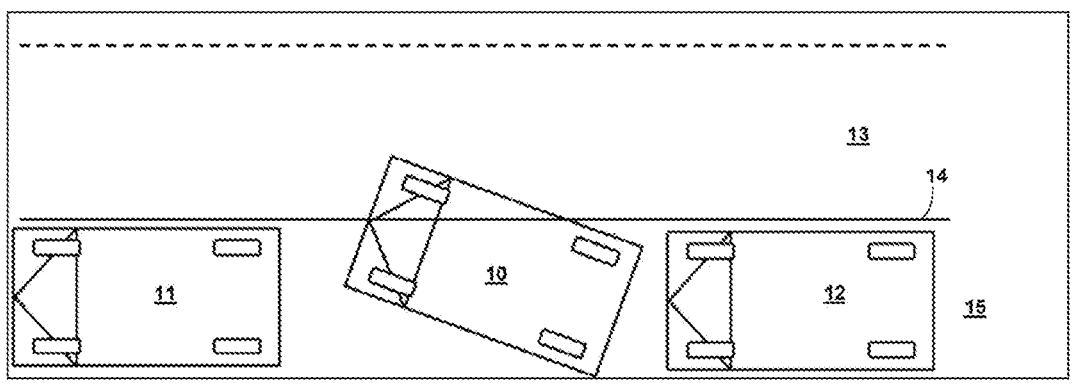
Figure 5:
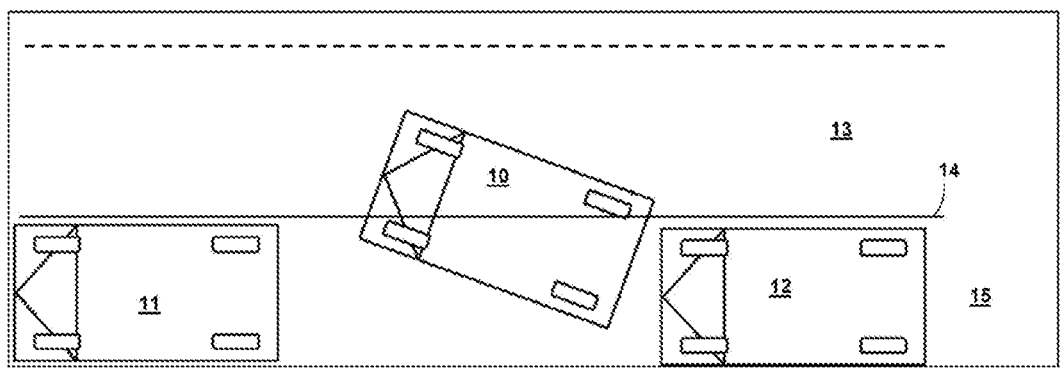

FIG. 2 shows in a possible scenario of a situation at an end of a first (rearward) move of the parking maneuver, wherein a tire of the motor vehicle 10 is disposed on the edge of the curb 14. FIG. 3 shows a situation immediately after a start of a second (forward) move of the parking maneuver, in which the tire rolls or slips off the curb.

According to the disclosure however, an adjustment of the parking trajectory 16 is carried out, and in particular of an end position reached at the end of the first move of the parking maneuver described above. According to FIG. 4, said adjustment can be carried out so that a relevant tire that is disposed on the edge of the curb 14 in the present scenario adopts a stable position on the curb with sufficient distance from the edge of the curb 14 to avoid rolling or slipping off the curb. According to FIG. 5, in an alternative scenario, the adjustment of the trajectory 16 can also be carried out in such a way that the tire is not driven onto the curb at all in the end position of the first move of the parking maneuver.

Figure 6A:
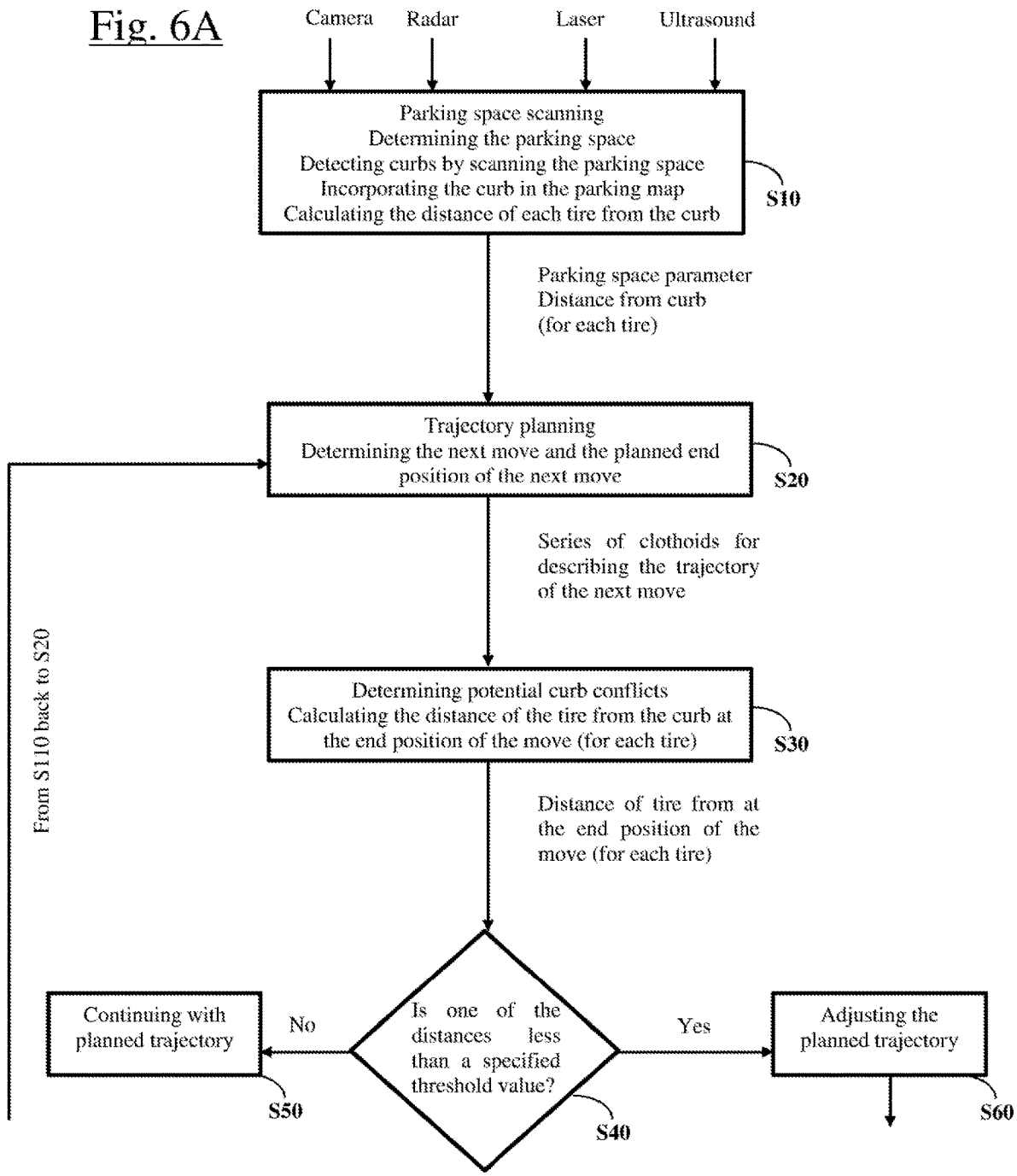
FIGS. 6A and 6B show a flow chart to describe a process of the method and device according to the disclosure in accordance with one embodiment.
Figure 6B:
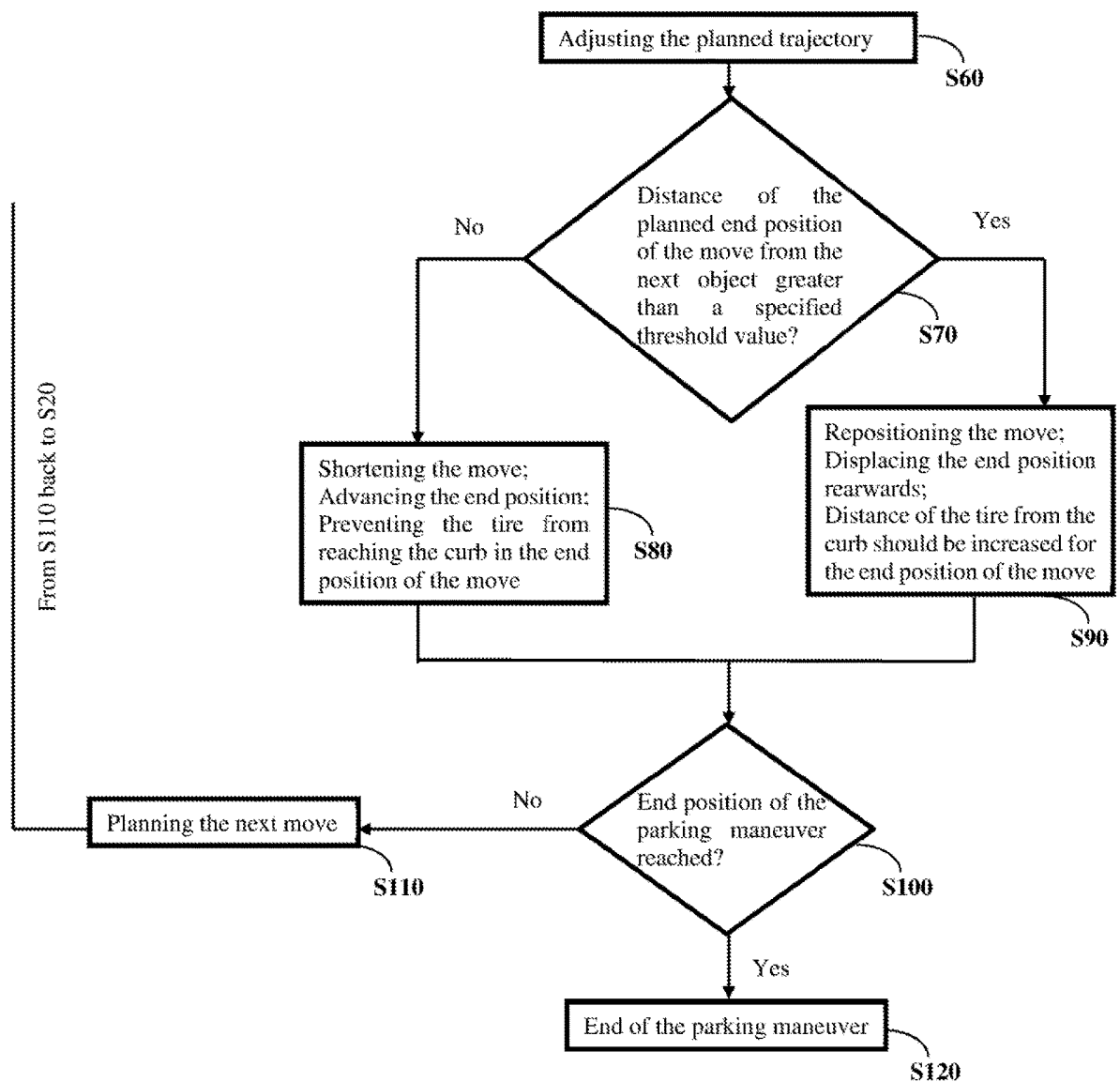

FIGS. 6A-B shows a flow chart for describing a typical process of the method according to the disclosure in accordance with one embodiment, which is also implemented on the device. According to FIGS. 6A-B, in a step S10 a sampling scan is carried out using camera sensors, radar sensors, laser scanner sensors and/or ultrasonic sensors for a determination of a parking space and detection of a curb, wherein the curb is incorporated into a relevant map of a parking situation, and a distance of each tire from the curb is calculated.

Based on the corresponding parameters of the parking space and the distance of each tire from the curb, trajectory planning is carried out in step S20, wherein in particular a next move of the parking maneuver is determined, and an intended end position of the next move of the maneuver is determined. In this case, a series of clothoids, or Euler spirals, can be determined that describe a trajectory of the next move of the maneuver. In step S30, a determination of possible curb conflicts is carried out, wherein a distance of a relevant tire from the curb in an end position of the next move of the maneuver is calculated for each tire.

In step S40, a query is carried out as to whether any of calculated distances lie below a specified threshold value. If any of the calculated distances do not lie below the specified threshold value, according to step S50 a resumption is carried out with a planned trajectory. If, according to the query of step S40, any of the calculated distances lies below the specified threshold value, adjustment of the planned trajectory is carried out in step S60.

Thereupon, a query is carried out in step S70 as to whether a distance of a planned end position of the next move of the maneuver from a next object, or obstacle, is greater than a specified threshold value. If the distance of the planned end position of the next move of the maneuver is not greater that the specified threshold value, the next move of the maneuver is shortened according to step S80 such that the planned end position "is moved forward", whereby a tire is prevented from being driven onto a curb in the planned end position of a relevant move of the maneuver. Otherwise, i.e. if according to the query of step S70 the distance of the planned end position of the move of the maneuver from the next object is greater than the specified threshold value, displacement of the planned end position "rearwards" is carried out according to step S90, such that a distance of the tire from an edge of the curb in the planned end position is increased in the relevant move of the maneuver.

In step S100, a query is carried out as to whether the planned end position of the parking maneuver has been reached. If the planned end position of the parking maneuver has been reached, the parking maneuver ends in step S120. If the planned end position of the parking maneuver has not been reached, planning of the next move of the maneuver is carried out according to step S110 with a return to step S20.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to assist a parking maneuver of a motor vehicle, comprising:
   detecting a curb bounded by an edge of the curb in a vehicle vicinity;
   determining a trajectory along which the motor vehicle can be moved into a parking space, the trajectory including at least one move of a maneuver;

responsive to detecting a tire of the vehicle overlapping the edge of the curb at an end position of the move of the maneuver, determining a distance between an end position and an object;

comparing the distance against a threshold;

responsive to determining the distance is less than the threshold, shortening the move of the maneuver to move forward the end position;

responsive to determining the distance is greater than the threshold, extending the move of the maneuver to move rearward the end position; and maneuvering the motor vehicle into the parking space defined by the trajectory, at least partly, automatically.

2. The method as claimed in claim 1, further comprising: shortening the move of the maneuver to move forward the end position without adjusting the trajectory.

3. The method as claimed in claim 1, further comprising: extending the move of the maneuver to move rearward the end position without adjusting the trajectory.

4. The method as claimed in claim 1, wherein detecting the curb includes using at least one ultrasonic sensor, radar sensor, laser scanner sensor and camera sensor.

5. A device that assists a parking maneuver, comprising: a processor configured to, determine a trajectory along which a vehicle can be moved into a parking space, the trajectory including at least one move of a maneuver, in response to a vehicle tire overlapping an edge of a curb at an end position of the move of the maneuver, determined during a vehicle movement into a parking space, determine a distance between an end position and an object, compare the distance against a threshold, responsive to determining the distance is less than the threshold, shorten the move of the maneuver to move forward the end position, and maneuver the motor vehicle into the parking space defined by the trajectory, at least partly, automatically.

6. The device as claimed in claim 5, wherein the processor is further configured to:

responsive to determining the distance is greater than the threshold, extend the move of the maneuver to move rearward the end position.

7. The device as claimed in claim 6, wherein processor is further configured to:

extend the move of the maneuver to move rearward the end position without adjusting the trajectory.

8. The device as claimed in claim 5, wherein the processor is further configured to:

shorten the move of the maneuver to move forward the end position without adjusting the trajectory.

9. The device as claimed in claim 5 further comprising an ultrasonic sensor, radar sensor, laser scanner sensor and camera sensor that detect the curb and the distance.

10. A parking assist system comprising:

a device configured to, determine a trajectory along which a vehicle can be moved into a parking space, the trajectory including at least one move of a maneuver, in response to an edge of a curb overlapping a vehicle tire at an end position of the move of the maneuver, determined during a vehicle movement, determine a distance between an end position and an object, compare the distance against a threshold, responsive to determining the distance is greater than the threshold, extend the move of the maneuver to move rearward the end position, and responsive to determining the distance is less than the threshold, shorten the move of the maneuver to move forward the end position.

11. The parking assist system as claimed in claim 10, wherein the device is further configured to:

shorten the move of the maneuver to move forward the end position without adjusting the trajectory.

12. The parking assist system as claimed in claim 10, wherein the device is further configured to:

extend the move of the maneuver to move rearward the end position without adjusting the trajectory.

13. The parking assist system as claimed in claim 10 further comprising an ultrasonic sensor, radar sensor, laser scanner sensor and camera sensor that detect the curb and the distance.

* * * * *